(12) United States Patent
Novaes et al.

(10) Patent No.: US 7,088,684 B2
(45) Date of Patent: Aug. 8, 2006

(54) METHODS AND ARRANGEMENTS FOR DYNAMICALLY MODIFYING SUBSOURCE ADDRESS MULTICAST DATA DISTRIBUTION TREES

(75) Inventors: Marcos N. Novaes, Hopewell Junction, NY (US); Christopher F. Codella, Marlboro, NY (US)

(73) Assignee: International Business Machines Corporation, Armonk, NY (US)

( * ) Notice: Subject to any disclaimer, the term of this patent is extended or adjusted under 35 U.S.C. 154(b) by 850 days.

(21) Appl. No.: 09/906,596

(22) Filed: Jul. 16, 2001

(65) Prior Publication Data
US 2003/0012130 A1   Jan. 16, 2003

(51) Int. Cl.
*H04L 12/44* (2006.01)

(52) U.S. Cl. ............... 370/256; 370/390; 370/408; 370/432

(58) Field of Classification Search ........ 370/216–221, 370/252, 254, 255, 389, 390, 392, 400, 401, 370/408, 432, 245; 709/220–222, 238, 239, 709/252
See application file for complete search history.

(56) References Cited

U.S. PATENT DOCUMENTS

| | | | | |
|---|---|---|---|---|
| 5,289,460 A | * | 2/1994 | Drake, Jr. et al. | 370/245 |
| 5,331,637 A | * | 7/1994 | Francis et al. | 370/408 |
| 5,606,669 A | * | 2/1997 | Bertin et al. | 709/223 |
| 5,805,578 A | * | 9/1998 | Stirpe et al. | 370/408 |
| 5,941,955 A | * | 8/1999 | Wilby et al. | 709/242 |
| 6,321,270 B1 | * | 11/2001 | Crawley | 709/238 |
| 6,330,229 B1 | * | 12/2001 | Jain et al. | 370/256 |
| 6,697,365 B1 | * | 2/2004 | Messenger | 370/390 |
| 6,707,796 B1 | * | 3/2004 | Li | 370/254 |
| 6,728,205 B1 | * | 4/2004 | Finn et al. | 370/217 |

* cited by examiner

Primary Examiner—Derrick Ferris
Assistant Examiner—Duc Duong
(74) Attorney, Agent, or Firm—Ference & Associates (57) ABSTRACT

Methods and arrangements for repositioning at least one node in a distributed network. Upon detection of a failed node in the network, subscription information relating to each direct child node of the failed node is retained at each direct child node.

13 Claims, 6 Drawing Sheets

METHODS AND ARRANGEMENTS FOR DYNAMICALLY MODIFYING SUBSOURCE ADDRESS MULTICAST DATA DISTRIBUTION TREES

FIELD OF THE INVENTION

The present invention relates generally to the field of digital communications, and more particularly to packet transmission systems involved in the management of multicast communications to a plurality of users.

BACKGROUND OF THE INVENTION

In the field of communication networks, the term multicast refers to a data package switching technology in which a single data packet is received by a plurality of nodes. This mode of transmission is specially useful when several nodes in the network need to receive data packets which emanate from the same source. The multicast technology reduces the number of separate transmissions and data switching operations which are necessary to deliver a data package to a set of nodes in a communications network. The communications network contains specialized nodes which are called router nodes, or package switching nodes. Such nodes perform the package switching operation which route a given data package along the network towards a specific destination.

The multicast capability of a network is an extension of the point to point transmission infrastructure of the communications network. There are known to exist a number of network communication standards, the most prominent being the Internet Protocol (IP). Other protocols exist which are distinct to IP, such as Asynchronous Transfer Mode (ATM), or are an extension of the IP protocol. Similarly, several multicast protocols exist which implement the multicast capability which are designed for the several point to point transmission mode protocols. The most prominent of such multicast protocols are the implementations of multicast, which are integrated with the basic IP protocol. Some of these implementations have become standards, such as DVMRP and PIM, and yet others remain under discussion, such as MOSPF. (These are all currently existing multicast technologies, as defined by the IETF [Internet Engineering Task Force]. As DVMRP [Distance Vector Multicast routing Protocol] and PIM [Protocol Independent Multicast] are now standard, they are published as Internet Drafts by the IETF. As MOSPF [Multicast Open Shortest Path First Protocol] is still under discussion at the IETF, it is published as an RFC document [i.e., "Request for Comments"]. The references for these protocols are as follows: DVMRP—IETF Internet Draft; MOSPF—IETF RFC 1584; and PIM—IETF Internet Draft.)

Generally, it can be said that all the currently existing multicast protocols have one characteristic in common, which is the fact that they utilize the same addressing scheme as the underlying point to point protocol. This fact limits the addressing capability of the multicast protocol to that of the underlying point to point protocol. For example, this characteristic makes the protocols in question unsuitable in a scenario in which a data source needs to send a data package to a subset of all of its receivers. Since the number of all possible subsets of receivers of data from a given source grows exponentially with the number of receivers, conventional multicast technology tends to be inadequate for a variety of applications requiring a finer addressing capability.

Apart from the fact that each conventional multicast protocol is usually designed as an extension of the underlying point to point protocol, another important aspect of the design of existing multicast technology is that of the design and maintenance of the multicast distribution trees. A multicast distribution tree is a distributed data structure which includes a number of router nodes, a number of source nodes and a number of receiver nodes. Typically, multicast distribution trees are derived from the actual configuration of the routers of the underlying protocol. In most such protocols, two nodes in the distribution tree are only "neighbors" if they are physically connected by a communications link. In some implementations, a facility exits which allows for a human operator to create links in a multicast distribution tree between two nodes which are not physical neighbors. Such links are called multicast tunnels. The utilization of multicast tunnels has become a necessity in several applications in which users are interconnected by a communications network which does not support any form of multicast protocol. This problem is particularly serious at present, because the most widely utilized communication network is the universal Internet, which was originally derived form the DoD (Department of Defense) ARPAnet and now is the most widely used private network which spans the entire planet and has a number of users approaching one billion.

The Internet presently only supports the IP point-to-point protocol. The Internet has been unable to support the IP multicast standard because of the sheer size of the Internet. In such a scenario, it becomes very hard to deploy a protocol which builds distribution trees efficiently. Even if this problem could be solved in the near future, another problem, the coarseness of the IP multicast addressing scheme, will still be a limitation of the multicast capability. In case the nodes in the interconnecting network do not support a protocol of choice, it will most likely be necessary to utilize protocol tunnels. The manual configuration, i.e., the construction of multicast distribution trees by human operators, becomes impractical in Internet applications.

In view of the foregoing, several needs have been recognized, among which is a need to provide multicast distribution tree technology configured for efficiently and automatically constructing a multicast distribution tree for nodes which are separated by a network which does not support the specific multicast protocol.

SUMMARY OF THE INVENTION

In accordance with at least one presently preferred embodiment of the present invention, the problem of distributing data packages to a refined set of subscriber nodes is solved by the provision of a method for organizing a network of router nodes into a distribution structure which is termed a Subsource Addressing Multicast Tree. Each node which publishes information in the network constructs a specific data distribution tree. In the event that nodes in the distribution tree fail, a method is provided which is capable of reorganizing the router nodes such that messages from the publisher node can again reach all the other nodes in the distribution tree.

In one aspect, the present invention provides a method of repositioning at least one node in a distributed network, the method comprising the steps of designating one of the nodes as a publisher node; detecting a failed node in the network, the failed node having at least one direct child node; and retaining subscription information relating to each direct child node at each direct child node.

In another aspect, the present invention provides an apparatus for repositioning at least one node in a distributed network, the apparatus comprising: an arrangement for designating one of the nodes as a publisher node; an arrangement for detecting a failed node in the network, the failed node having at least one direct child node; and an arrangement for ensuring that subscription information relating to each direct child node is retained at each direct child node.

Furthermore, in an additional aspect, the present invention provides a program storage device readable by machine, tangibly embodying a program of instructions executable by the machine to perform method steps for repositioning at least one node in a distributed network, the method comprising the steps of: designating one of the nodes as a publisher node; detecting a failed node in the network, the failed node having at least one direct child node; and retaining subscription information relating to each direct child node at each direct child node.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Several other copending and commonly owned U.S. patent applications, filed concurrently herewith, disclose various processes and arrangements whose details may, in the role of background information, help provide a better understanding of one or more of the embodiments disclosed and contemplated herein. Accordingly, those applications are hereby fully incorporated by reference as if set forth in their entirety herein, and are as follows (including the tide and application Ser. No. for each one): "Methods And Apparatus for the Propagation Of Multicast Transmissions In A Communications Network" (Application Ser. No. 09/906,928); "Methods and Apparatus for Updating Subsource Addressing Multicast Routing Records in a Communications Network" (Application Ser. No. 09/906,597); "Methods and Arrangements for Building a Subsource Address Multicast Distribution Tree Using Traced Routes" (application Ser. No. 09/906,936); "Methods and Arrangements for Building a Subsource Address Multicast Distribution Tree Using Point to Point Routing Records" (application Ser. No. 09/906,937); "Methods and Arrangements for Building a Subsource Address Multicast Distribution Tree Using Network Bandwidth Estimates" (application Ser. No. 09/906,939); "Methods and Arrangements for Monitoring Subsource Addressing Multicast Distribution Trees" (application Ser. No. 09/906,593); "Methods and Arrangements for Establishing a Group Collaboration Session Utilizing Multiple Multicast Distribution Trees" (application Ser. No. 09/906,935); and "Methods and Arrangements for Multicasting a Data Steam at Different Data Rates to Groups of Subscribers" (application Ser. No. 09/906,938).

Throughout the present disclosure, various terms are utilized that are generally well-known to those of ordinary skill in the art. However, for the purposes of providing additional clarity, a number of such terms are briefly defined immediately herebelow. (Though one or more of the terms may well be defined elsewhere herein, it is deemed useful at this juncture to gather all of the following terms in one place, to provide a glossary of sorts that may serve, when needed, as a convenient and easily discernible reference point.)

A "data distribution path" is defined as the sequence of routing nodes which a specific message traverses from the moment that it originates in a publisher node to the moment that it arrives in a receiver node.

A "node" is a general vertex in the multicast distribution tree. There are three specific types of nodes in a SAM tree: the publisher node, which is the root of the tree, the intermediate nodes, which are the nodes with child nodes which are not the root node, and the leaf nodes, which are nodes without any children nodes. The term node is used in this embodiment to generally refer to any of type of node in the SAM tree.

As employed herein, the term "package switching operation" is used to refer to the operation performed by intermediate nodes, also called router nodes, in the data distribution path of a given data transmission. This operation involves receiving the data package and then making a decision of where to retransmit it, if necessary. This decision is made utilizing data that is stored in the proximity of the router node, generally referred to as routing tables. After the routing table are consulted, a package switching node will retransmit (switch) a package to either another intermediate router node or the final receiver of the package.

The term "piece wise point to point" is used to describe the way in which the SAM technology exploits the underlying point to point network protocol in multicasting a message to a plurality of receivers. A SAM message originates at the root node and is addressed with the point to point address of either a final receiver node or an intermediate router node. Whenever an intermediate router node receives a SAM message, it will retransmit it to one or more point to point addresses, of either final receivers or intermediate nodes. This operation is repeated until the message finally reaches a final receiver, or leaf node in the SAM tree. Therefore, a single message is transmitted to a variety of receivers utilizing different point to point addresses along the transmission path. It can thus be said that SAM transmissions are always made using the point to point mode of transmission at every step (piece) of the transmission path, and that the transmission pattern is therefore piece wise point to point.

The term "point of divergence" refers to a node in the SAM tree which has more than one descendant node to which it has to route a given message.

The term "point to point" is used to refer to a transmission mode in which a given message is transmitted from a single source (or point) to a single receiver. Typically, communication networks only support point to point protocols, the most prevalently used being the Internet Protocol (IP) and the Asynchronous Transfer Mode (ATM) protocols. Other modes of transmission are possible, such a broadcast and multicast. Such protocol can be implemented extensions of the underlying (basic) point to point protocol.

The term "point to point address" refers to a network address utilized by basic point to point protocol provided by the communications network.

The term "protocol tunneling" refers to a technique which makes possible to transmit a data package encoded by a given protocol in a network which does not offer direct support for the protocol. The technique involves the encapsulation of the data package into a data segment which is addressed utilizing the basic point to point protocol supported by the network. The package is then transmitted from to a node which is able to receive and process it. These two nodes are referred to as the end points of the tunnel. The receiving node is then able decapsulate the original data package and retransmit it further. Eventually, the package arrives at a network which offers native support for the protocol.

A "publisher node" is a node which is a source of a given information. In SAM, messages are multicasted to a plurality of receivers utilizing a distribution tree, named the SAM tree, which is rooted at the publisher node.

The term "predicate" is used to refer to an additional data field used by SAM to extend the addressing capability of an underlying point to point protocol. This field is used by applications to store data which is used to define specific subsets of the information that originates from a publisher node.

The term "router node" is used to refer to a node which retransmits a given data package such that it can reach a specific final destination. The term "package switching node" is synonymous with this term.

"SAM" is an abbreviation for "Subsource Addressing Multicast".

The term "SAM protocol" refers to the collection of methods and operations which are used by source nodes to express interest in the subsets of information published by a given source, and by the source of information to publish message to subsets of subscribers.

The "SAM tree" is a data structure utilized to multicast messages from the node which is the source of the tree. The intermediate nodes (nodes without children) of the SAM tree are nodes which are capable of routing SAM messages to any of their descendants. The leaf nodes (nodes without children) are nodes that are final receivers of SMA messages. It is also possible for an intermediate node to be a final receiver of a SAM message.

The term "shared paths" is used in reference to the intersection of transmission path segments for a message addressed to a plurality of subscribers. In this embodiment this term is used in reference to both point to point and multicast routing paths. A point to point shared transmission path between two receivers of a message occurs when the routing decisions taken by the underlying point to point protocol define paths that traverse the same sequence of routing nodes for some portion of the paths. Similarly, a multicast shared path is an equal sequence of multicast routing nodes in the transmission paths for messages destined for multiple multicast addresses. In the field of multicast communications, performance gains are realized by exploiting common transmission paths, or shared paths, in both the point to point and the multicast package switching infrastructure.

The term "subsource addressing multicast" is used to collectively refer to a set of technologies which make possible for a source of information to multicast messages to any given subset of its receivers. This technology includes the SAM protocol and the SAM tree discussed above.

As employed herein, a "subscriber" is a node which has posted at least one subscriber operation, and a final receiver of SAM messages.

The term "tunneling" refers to the act of deploying a protocol tunnel (described above) for the transmission of a message.

The term "underlying protocol" is used to refer to the basic point to point protocol supported by the communications network.

At least one presently preferred embodiment of the present invention broadly embraces a multicast distribution tree capable of realizing multiple distribution paths. The distribution tree may be referred to as a Subsource Addressing Multicast tree, or a SAM tree. As described herebelow, the SAM tree is capable of realizing optimal distribution paths for any subset of the nodes of a given source which is the root of the tree. The tree is preferably configured such that it can be deployed as an extension of any underlying point to point protocol.

In accordance with at least one presently preferred embodiment of the present invention, the SAM multicast distribution tree is distinguished from other distribution trees because any given intermediate node can propagate a message not only to its direct descendants, but also to any number of indirect descendants. Therefore, in addition to keeping the basic state information which is required from a multicast distribution tree, such as parent and direct descendant information, each intermediate node in the tree also keeps data related to the propagation to indirect descendants. In other words, the SAM multicast tree can be used to propagate messages in a plurality of paths. In actuality, the SAM trees allows for the all possible combinations of data transfer paths between the root node of the tree and all possible subsets of its descendants. The SAM tree can therefore be utilized to support a very fine grained addressing scheme, such as the SAM protocol.

Figure 1:
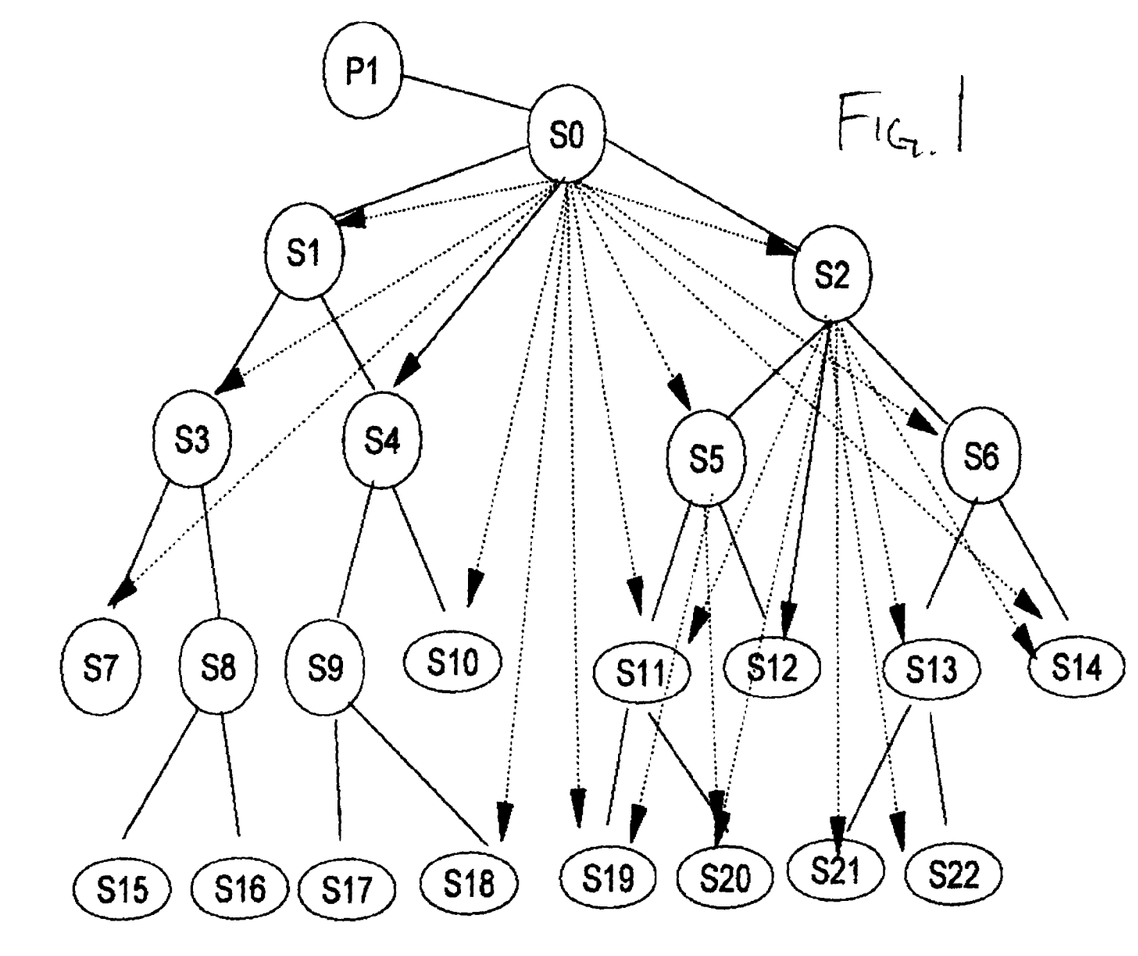
FIG. 1 schematically illustrates a distribution tree and some possible paths for data propagation.

FIG. 1 illustrates a SAM tree and a few of the possible paths for data propagation from the node So, denoted by the dotted arrows. Not all possible paths are shown, so as not to impair the clarity of the illustration. Each parent node is capable of sending a message directly or via a protocol tunnel to any of its descendants. The collection of all possible subpaths generate a distribution mesh capable of efficiently multicasting messages to any subset of receivers making optimum use of the shared transmission paths among receivers.

The data propagation patterns determined by the SAM propagation tree are preferably such that a message destined for multiple nodes will incur a minimum number of retransmissions. In one embodiment, this is achieved by forcing the retransmissions to occur only at the points of divergence in the propagation path. This will result in the optimal utilization of shared paths among the subsets of receivers of the message. The direct transmission of a message from a parent node to its descendants can be made via a protocol tunnel, which will result in further gains in performance.

Preferably, the SAM tree includes a root node P1, which is the publisher of information, and a set of nodes (e.g., S0–S22) which are either direct or indirect descendants of the root node P1. The descendants of the root node P1 can be either the final destination of notification messages or intermediate router nodes. A router node is a node capable of forwarding notification messages to other router nodes or subscriber nodes. A subscriber node is a node which is a final destination for a notification message. A router node may be a subscriber node as well as a router node.

As previously mentioned, multicast capability is usually added to a network as an extension of some previously existing point to point protocol. Preferably, the SAM tree is configured such that it makes an optimal use of the existing point to point message switching infrastructure. When a parent node in the SAM tree relays a message to one if its descendants utilizing the descendant's point to point address directly, it is avoiding the overhead of making several package switching operation at each intermediate node in the path from the parent to the descendant.

Since SAM extends the addressing capability of the underlying point to point protocol, it involves two kinds of data switching operations:
 i. the basic point to point package switching operation
 ii. the extended multicast package switching operation, which is performed by the nodes in the network which function as SAM routers.

The direct addressing capability of the SAM tree results in a savings of both kinds of package switching operations, which makes SAM a very efficient multicast package switching infrastructure.

Preferably, the SAM communication infrastructure keeps specific state information in every node which participates in a SAM network. Accordingly, each node in a SAM network preferably keeps the following state:
 i. Point to Point Address of the parent node
 ii. Point to Point Address of each child node
 iii. SAM distribution lists for any of the subsets of the node's descendants In a preferred embodiment, the distribution lists are identified by a predicate field, which extends the addressing capability of the underlying point to point protocol. This extra field is utilized by the specific application which uses the SAM protocol to identify subsets of receivers of the published information. The utilization of an application specific predicate field as a network address is a unique characteristic embraced herein.

The aforementioned embodiment carries out a preferred implementation of the SAM tree utilizing subscription and notification operations which utilize the predicate field. Here, an implementation utilizing the IP protocol as the underlying point to point protocol is discussed, but it should be understood that any similar implementation utilizing any other underlying protocol will not deviate from the spirit or scope of the present invention.

Preferably, the network addresses in SAM are defined by a pair of the following format:
  <source,predicate> where:
 i. The address of a source of information is itself expressed as a pair of the format [host address, port number]. The host address conforms to the addressing scheme of the underlying point to point protocol. In a sample implementation using TCP/IP this address can be given in dotted decimal format, or alternatively as a host name which can be mapped into a network address, and the port number refers to a communication port which is bound to the publisher process.
 ii. The predicate field is utilized by the subscribers to specify a predicate which is interpreted by the publisher process to select a subset of the information stream.

(Though it is feasible to implement SAM over a variety of network protocols, the present discussion will be limited to implementation based on TCP/IP.)

For example, suppose that the publisher provides an information stream including an integer series which is updated at every second. For the present discussion, this information stream may be labeled "the value of X".

Assume now that a subscriber process wants to receive the current value of X, which is published by node P1 at port 7777, but only if X is greater than 130. In SAM, it is possible to express this specific interest with the following network address:
  <P1:7777,"X>130">

In another example, the values of the X series indicate unique identifiers which label data items. Therefore, the subscriber could express the desire to receive updates of an item numbered 12345, published by P1 at port 8888, utilizing the following SAM address:
  <P1:8888,"X=12345">

The SAM predicate value is preferably handled as a binary value which extends the IP network address, therefore "refining" the granularity of the addressability. It is therefore possible for subscribers to utilize any value, as long as this value can be understood by the publisher of the information. The routers using the SAM protocol have no semantic understanding of the predicates; they are handled exactly as network addresses. This allows SAM to be utilized by essentially any type of publisher system, even supporting different lengths in the predicate field.

The disclosure now turns to a discussion of methods and arrangements for dynamically modifying subsource address multicast data distribution trees, in accordance with at least one presently preferred embodiment of the present invention.

The SAM connection is established when a node joins a particular SAM tree. After a subscriber establishes a SAM connection to a particular publisher node, it is able to post subscriptions and receive notifications from that publisher. As noted among the copending and commonly owned U.S. patent applications filed concurrently herewith, "Methods And Apparatus for the Propagation Of Multicast Transmissions In A Communications Network" (application Ser. No. 09/906,928), "Methods and Apparatus for Updating Subsource Addressing Multicast Routing Records in a Communications Network" (application Ser. No. 09/906,597). "Methods and Arrangements for Building a Subsource Address Multicast Distribution Tree Using Traced Routes" (application Ser. No. 09/906,936), "Methods and Arrangements for Building a Subsource Address Multicast Distribution Tree Using Point to Point Routing Records" (application Serial No. 09/906,937), and "Methods and Arrangements for Building a Subsource Address Multicast Distribution Tree Using Network Bandwidth Estimates" (application Ser. No. 09/906,939), subscription operations may preferably be propagated upward to the publisher node in a hop by hop fashion, and each intermediate node keeps a record of the subscription, or modifies its SAM routing table accordingly. Therefore, each SAM connection will generate more entries in the muting tables of each intermediate node. In some instances, it is desirable to keep all the routing records related to a SAM connection, even in the event the publisher node goes temporarily out of service, because the process of propagating them is time consuming. In other instances, it is desirable to limit the size of the SAM routing tables, and so the SAM records related to a particular SAM connection are deleted in the case tat either the publisher node or the subscriber node go temporarily out of service.

Described herebelow are methods which manage the SAM connections according to the needs of the specific application. A SAM connection in which the routing records are kept even in the event that the publisher node or the subscriber node become unavailable is termed a persistent SAM connection. Likewise, if the routing records are deleted in the event the either the publisher node or a subscriber node become unavailable is termed a transient SAM connection. Described herebelow are methods for managing both kinds of connections, and also discuss procedures in which the connection data can be transported such that a node in the SAM tree may be moved when necessary.

In a persistent SAM connection, the routing data related to a specific connection is not discarded in the event that either the subscriber or the publisher node become temporarily available. In this connection type, the routing records associated with a certain connection are only deleted when a specific disconnect message is sent from the subscriber node. The disconnect message is propagated using the same path taken by the subscription messages, going from the subscriber node to its parent node, and continues to be propagated up the SAM tree to each intermediate node until it reaches the publisher node.

Figure 2:
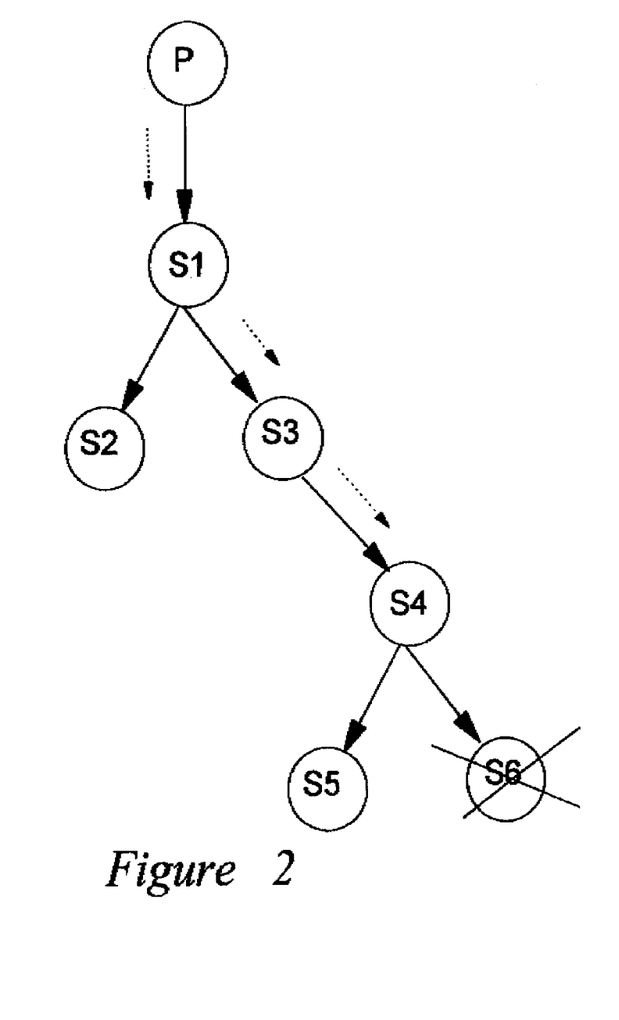
FIG. 2 illustrates a distribution tree with a downwardly propagating message.

In a transient SAM connection, on the other hand, the routing data related to a specific connection is discarded when it is detected that either the publisher node or the subscriber have become unavailable. When the publisher node detects a failure of the subscriber node, it will send a disconnect message that is propagated hop by hop down the SAM tree, in the direction of the failed subscriber node. Each intermediate node which receives this message will delete the routing records associated with the subscriber identified in the disconnect message and continues to forward the disconnect message to the next intermediate node in the direction of the publisher node failed subscriber node. These actions are illustrated in FIG. 2, where P is the publisher nodes and S1–S6 are other nodes, and where S6 is a failed subscriber node.

Figure 3:
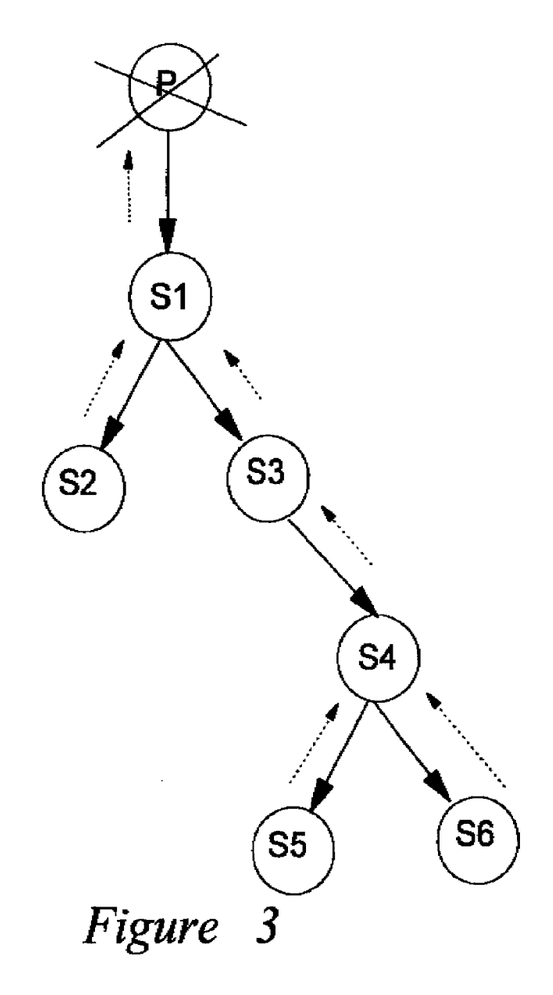
FIG. 3 illustrates a distribution tree with an upwardly propagating message.

Similarly, when the subscriber node detects the failure of the publisher node, it will send a disconnect message which is propagated hop by hop, going up the SAM three in the direction of the publisher node, as shown in FIG. 3.

In the event that changes happen in the underlying point to point network, it is sometimes desirable to move a node of the SAM tree. For example, in the event of a failure of an intermediate node in the SAM tree, it may be desirable or necessary to move the children nodes of the failed intermediate node to a new location in the tree. Thus, the disclosure now turns to a procedure with which a node can be moved while preserving the SAM connection information of all subscriber nodes which are impacted by the change.

Figure 4:
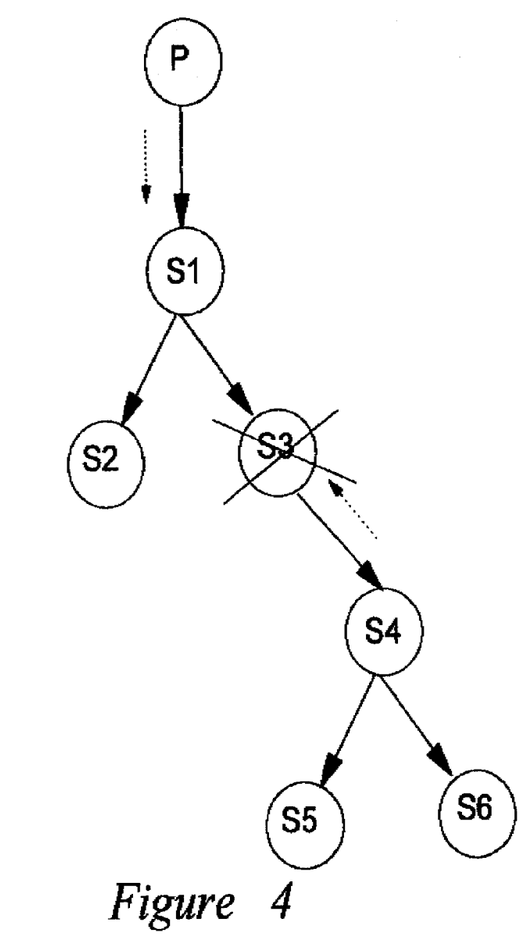
FIG. 4 illustrates a distribution tree with a failing intermediate node.

The movement of a node is initiated when a failure is detected in the SAM tree. In this event, the publisher node will repeat the node placement procedure for each child of the failed node, and will notify each child node of the address of a new parent node. Each child node is then detached from the tree and disconnect messages are transmitted from the publisher node and the node being detached. The transmission of the disconnect messages is done such that all connection data is erased in all intermediate nodes, concerning subscriptions made by the detached node and all of its descendants. The flow of the disconnect messages is shown in FIG. 4, where the failure is at node S3.

Figure 5:
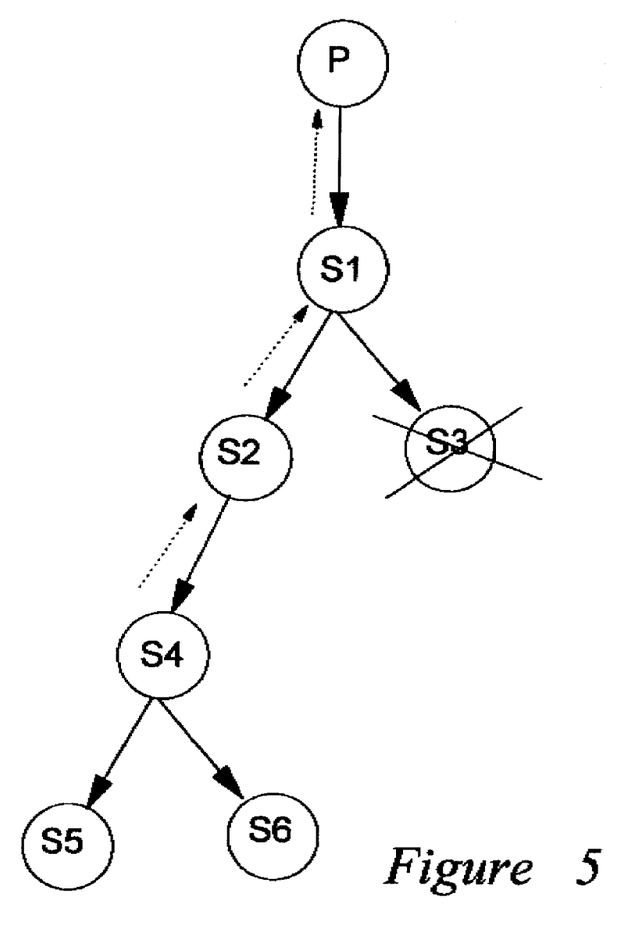
FIG. 5 illustrates the distribution tree of FIG. 4, but after a reattachment procedure.

Preferably, the detached node (S4 in FIG. 4) will request to the publisher node to be re-inserted in the SAM tree. The publisher node will utilize a node placement procedure to compute the new insertion point, which for the sake of discussion is assumed to be the node S2. The disconnected node S4 will then be attached to the new parent (S2), and will then utilize a specific method to propagate the subscription information that was stored in it (S4, the node being moved). It should be noted that it is not necessary to alter any of the routing information stored in the intermediate nodes that descend from the reattached node. This is so due to the nature of the subscription propagation process, and this is a powerful feature of the methods here described. Therefore, when the node is reattached, it suffices for to repost the subscriptions which listed in its routing table. These subscriptions are propagated up the tree, preferably utilizing a hop by hop propagation method for subscriptions as described in the copending and commonly owned U.S. patent application filed concurrently herewith, "Methods and Apparatus for Updating Subsource Addressing Multicast Routing Records in a Communications Network" (application Ser. No. 09/906,597). FIG. 5 depicts the sample tree of FIG. 4 but subsequent to reattachment, and the hop by hop transmission of the subscription messages is shown by the dotted arrows in FIG. 5.

The reattached node (S4) will read each entry in its SAM routing table, and utilize a decision method to decide how to propagate the subscription to its parent node. It will preferably utilize the following criteria in making this decision:
 i. If there is only one member in the notification list, then the subscription entry is transmitted without changes to the parent node.
 ii. If there is more than one address in the notification list, it is an indication that the reattached node is the fork node for the subscription. Therefore a subscription message is generated which lists the same predicate, and only the reattached node as the recipient.

Figure 6:
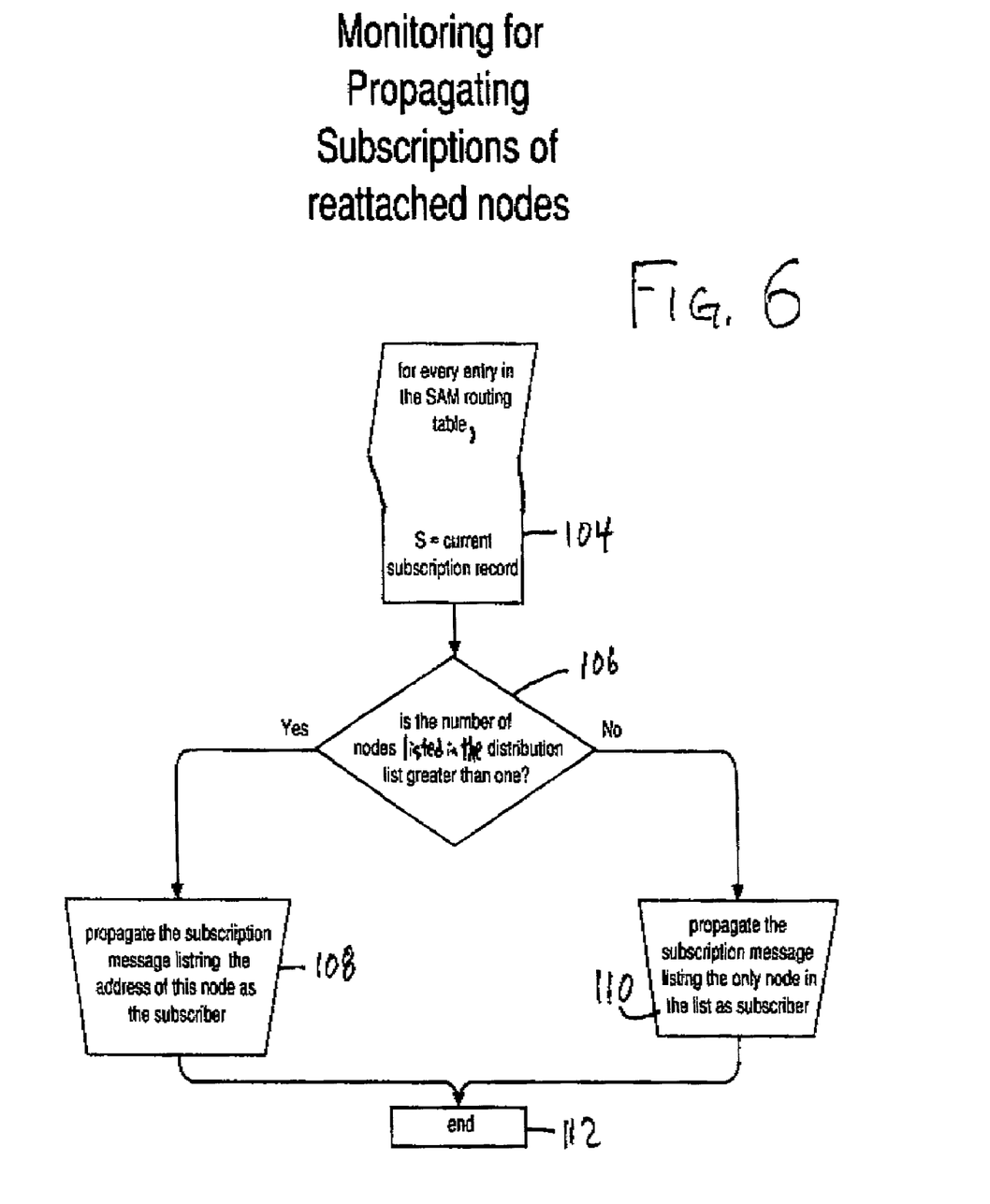
FIG. 6 schematically illustrates a procedure by which a reattached node builds subscription messages.

FIG. 6 illustrates a method by which a reattached node may preferably build subscription messages for each subscription entry stored in its SAM routing tables. Particularly, at 104, for every entry in the SAM routing table, S is assigned as the current subscription record. At 106, it is queried as to whether the number of nodes listed in the distribution list is greater than one. If yes, then at 108 a subscription message is propagated listing the address of the node at issue as the subscriber. The process then ends at 112.

If the answer to the query at 106 is "no", then at 110 a subscription message is propagated listing the only node in the list as the subscriber.

It is to be understood that the present invention, in accordance with at least one presently preferred embodiment, includes an arrangement for designating one of the nodes as a publisher node, an arrangement for detecting a failed node in the network, and an arrangement for ensuring that subscription information relating to each direct child node is retained at each direct child node, which together may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of repositioning at least one node in a distributed network, said method comprising the steps of:
designating one of the nodes as a publisher node;
detecting a failed node in the network, the failed node having at least one direct child node;
retaining subscription information relating to each direct child node at each direct child node;
erasing subscription information relating to each direct child node of the failed node at any and all intermediate nodes between each direct child node of the failed node and said publisher node;
reattaching each direct child node of the failed node at another node in the network; and
reestablishing information relating to each direct child node at any and all intermediate nodes between each direct child node of the failed node and said publisher node subsequent to said step of reattaching.

2. The method according to claim 1, further comprising the steps of:
transmitting subscription information from each direct child node of the failed node to said publisher node subsequent to said step of reattaching.

3. The method according to claim 2, wherein:
said step of retaining information comprises retaining a distribution list relating to each direct child node of the failed node; and
for each direct child node of the failed node, if the number of nodes in the distribution list is greater than one, then said transmitting step comprises transmitting altered subscription information to the publisher node.

4. The method according to claim 3, wherein said step of transmitting altered subscription information comprises transmitting subscription information listing solely the transmitting node as a subscriber.

5. The method according to claim 2, wherein:
said step of retaining information comprises retaining a distribution list relating to each direct child node of the failed node; and
for each direct child node of the failed node, if the number of nodes in the distribution list is only one, then said transmitting step comprises transmitting unaltered subscription information to the publisher node.

6. The method according to claim 2, wherein said transmitting step comprises the step of transmitting subscription information hop by hop to said publisher node.

7. An apparatus for repositioning at least one node in a distributed network, said apparatus comprising:
an arrangement for designating one of the nodes as a publisher node;
an arrangement for detecting a failed node in the network, the failed node having at least one direct child node;
an arrangement for ensuring that subscription information relating to each direct child node is retained at each direct child node;
an arrangement for erasing subscription information relating to each direct child node of the failed node at any and all intermediate nodes between each direct child node of the failed node and said publisher node;
an arrangement for reattaching each direct child node of the failed node at another node in the network; and
an arrangement for reestablishing information relating to each direct child node at any and all intermediate nodes between each direct child node of the failed node and said publisher node subsequent to reattachment.

8. The apparatus according to claim 7, further comprising:
an arrangement for ensuring the transmission of subscription information from each direct child node of the failed node to said publisher node subsequent to reattachment.

9. The apparatus according to claim 8, wherein:
said arrangement for ensuring the retention of information is adapted to ensure retention of a distribution list relating to each direct child node of the failed node; and
said arrangement for ensuring transmission of subscription information is adapted to ensure, for each direct child node of the failed node, the transmission of altered subscription information to the publisher node if the number of nodes in the distribution list is greater than one.

10. The apparatus according to claim 8, wherein said arrangement for ensuring transmission of subscription information is adapted to ensure the transmission of subscription information hop by hop to said publisher node.

11. The apparatus according to claim 9 wherein said arrangement for ensuring transmission of subscription information is adapted to transmit subscription information listing solely the transmitting node as a subscriber.

12. The apparatus according to claim 8, wherein:
said arrangement for ensuring the retention of information is adapted to ensure retention of a distribution list relating to each direct child node of the failed node; and
said arrangement for ensuring transmission of subscription information is adapted to ensure, for each direct child node of the failed node, the transmission of altered subscription information to the publisher node if the number of nodes in the distribution list is only one.

13. A program storage device readable by machine, tangibly embodying a program of instructions executable by the machine to perform method steps for repositioning at least one node in a distributed network, said method comprising the steps of:
designating one of the nodes as a publisher node;
detecting a failed node in the network, the failed node having at least one direct child node;
retaining subscription information relating to each direct child node at each direct child node;
erasing subscription information relating to each direct child node of the failed node at an and all intermediate nodes between each direct child node of the failed node and said publisher node;
reattaching each direct child node of the failed node at another node in the network; and
reestablishing information relating to each direct child node at any and all intermediate nodes between each direct child node of the failed node and said publisher node subsequent to said step of reattaching.

* * * * *

UNITED STATES PATENT AND TRADEMARK OFFICE
CERTIFICATE OF CORRECTION

PATENT NO. : 7,088,684 B2  
APPLICATION NO. : 09/906596  
DATED : August 8, 2006  
INVENTOR(S) : Novaes et al.

It is certified that error appears in the above-identified patent and that said Letters Patent is hereby corrected as shown below:

Column 12, Claim 13, Line 51, "an" should be --any--

Signed and Sealed this

Third Day of April, 2007

JON W. DUDAS  
*Director of the United States Patent and Trademark Office*